US009706268B2

United States Patent
Lee

(10) Patent No.: US 9,706,268 B2
(45) Date of Patent: Jul. 11, 2017

(54) THREE-PHASE POWER LINE COMMUNICATION APPARATUS AND COMMUNICATION METHOD THEREOF

(71) Applicant: LSIS CO., LTD., Anyang-si, Gyeonggi-do (KR)

(72) Inventor: Seong Joon Lee, Gunpo-si (KR)

(73) Assignee: LSIS CO., LTD, Anyang-si (KR)

( * ) Notice: Subject to any disclaimer, the term of this patent is extended or adjusted under 35 U.S.C. 154(b) by 93 days.

(21) Appl. No.: 14/675,502

(22) Filed: Mar. 31, 2015

(65) Prior Publication Data

US 2015/0296277 A1    Oct. 15, 2015

(30) Foreign Application Priority Data

Apr. 14, 2014  (KR) .......................... 10-2014-0044373

(51) Int. Cl.
G08C 15/06    (2006.01)
H04Q 9/00    (2006.01)
H04B 3/54    (2006.01)

(52) U.S. Cl.
CPC ................. H04Q 9/00 (2013.01); H04B 3/54 (2013.01); H04B 3/546 (2013.01);
(Continued)

(58) Field of Classification Search
CPC ......... H02J 13/0086; H04B 2203/5466; H04B 2203/5408; H04B 2203/5433;
(Continued)

(56) References Cited

U.S. PATENT DOCUMENTS 5,032,833 A * 7/1991 Laporte ............... H02J 13/0086
340/2.1
7,333,003 B1 * 2/2008 Landry ................. H04B 3/546
340/12.36

(Continued)

FOREIGN PATENT DOCUMENTS

EP    0395495    10/1990
EP    1475903    5/2003

OTHER PUBLICATIONS

European Patent Office Application Serial 15162189.3, Search Report dated Aug. 31, 2015, 7 pages.

*Primary Examiner* — George Bugg
*Assistant Examiner* — Renee Dorsey
(74) *Attorney, Agent, or Firm* — Lee, Hong, Degerman, Kang & Waimey PC

(57) ABSTRACT

Disclosed are a three-phase power line communication apparatus and a communication method thereof, and more particularly, to a three-phase power line communication apparatus capable of establishing a network group for each of three phases, performing communication by each established network group, setting a communication plan by each established network group, and performing communication with meters installed on each phase, in order to solve the conventional communication collision occurring on a single network group, and a communication method thereof. Since a network group is established for each of three phases and communication is performed by each network group, communication can be performed precisely and systematically, and data exchange and data management between communication apparatuses can be facilitated.

6 Claims, 6 Drawing Sheets

(52) U.S. Cl.
CPC ............... *H04B 2203/5433* (2013.01); *H04B 2203/5466* (2013.01); *H04Q 2209/00* (2013.01); *H04Q 2209/60* (2013.01)

(58) Field of Classification Search
CPC .......... H04B 3/542; H04B 3/546; H04B 3/54; H04L 12/403; H04L 45/00; H04Q 2209/00; H04Q 2209/60; H04Q 9/00
See application file for complete search history.

(56) References Cited

U.S. PATENT DOCUMENTS

| | | | |
|---|---|---|---|
| 7,362,085 B2* | 4/2008 | Tsudaka | H02J 13/0079 324/66 |
| 2002/0130768 A1* | 9/2002 | Che | H04B 3/54 375/259 |
| 2004/0222698 A1* | 11/2004 | Hammond | H04B 3/54 307/3 |
| 2010/0188254 A1* | 7/2010 | Johnson | H04W 36/30 340/870.02 |

* cited by examiner

US 9,706,268 B2

THREE-PHASE POWER LINE COMMUNICATION APPARATUS AND COMMUNICATION METHOD THEREOF

CROSS-REFERENCE TO RELATED APPLICATION

Pursuant to 35 U.S.C. §119(a), this application claims the benefit of earlier filing date and right of priority to Korean Application No. 10-2014-0044373, filed on Apr. 14, 2014, the contents of which is incorporated by reference herein in its entirety.

BACKGROUND OF THE INVENTION

1. Field of the Invention

This specification relates to a three-phase power line communication apparatus and a communication method thereof, and more particularly, to a three-phase power line communication apparatus capable of establishing a network group for each of three phases, and capable of performing communication according to the established network group, and a communication method thereof.

2. Background of the Invention

FIG. 1 is a conceptual view illustrating a configuration and an operation of a remote reading system in accordance with the conventional art.

As shown in FIG. 1, in the conventional remote reading system, when meters of modems for three phases perform meter-reading communication with a master device having a three-phase communication modem, the lower meters connected to each phase are recognized as a single network. Then, the meters are selected by ID order or arbitrarily, and reading data is requested. When meter-reading communication fails, re-transmission of the reading data is requested by applying the same policy to all the meters.

The conventional remote reading system does not consider communication collision which may occur when an independent network of three phases is processed by a single apparatus. A single master device simultaneously requests data from a plurality of meters, so as to collect reading data of the plurality of meters.

A meter modem checks whether a channel is available before attempting to perform communication due to characteristics of power line communication (PLC). If the channel is in an available status, the meter modem starts communication by sending a signal indicating that the channel is in an available status. In this instance, a meter modem for S phase and a meter modem for T phase cannot receive the signal before meters for R phase attempt communication, because communication for three phases is performed in a separated manner by each phase. While a single meter for R phase attempts to perform communication, meters for S and T phases may perform communication. This may cause the master device which simultaneously receives signals for three phases, to have communication collision.

Further, a network for each phase requests re-transmission of data, if a response to a data request is not received from a plurality of meters. In this instance, each meter has a different communication performance. A meter having an excellent communication performance may have a small number of re-transmission, whereas a meter having a poor communication performance may have a large number of re-transmission. However, in the conventional remote reading system, the same number of re-transmission is performed without considering such a principle. As a result, a meter having a poor communication performance may not make reattempts, even in a situation where a preset number of times of re-transmission is 3 times, and the meter having a poor communication performance can succeed if it makes reattempts 4 times. This may cause failure of data transmission.

SUMMARY OF THE INVENTION

Therefore, an aspect of the detailed description is to provide a three-phase power line communication apparatus capable of establishing a network group for each of three phases, performing communication by each established network group, setting a communication plan by each established network group, and performing communication with meters installed on each phase, in order to solve the conventional communication collision occurring on a single network group, and a communication method thereof.

To achieve these and other advantages and in accordance with the purpose of this specification, as embodied and broadly described herein, there is provided a three-phase power line communication apparatus, including: a transceiver configured to transceive communication information and reading data with a plurality of meters installed on three phases, through communication with the plurality of meters; and a controller configured to establish a network group for each of the three phases based on the communication information received from the plurality of meters, to generate a communication plan for communication with each of the network groups by analyzing a communication performance of each of the network groups, and to control communication with the plurality of meters based on the communication plan.

In an embodiment, the plurality of meters may perform communication with a neighboring meter, and generate the communication information by measuring a communication state with the neighboring meter.

In an embodiment, the transceiver may be implemented as at least one communication interface connected to each of the three phases.

In an embodiment, the controller may transmit a test signal to the plurality of meters included in each of the network groups, at least once. Then, the controller may receive a response signal to the test signal, from the plurality of meters, and may analyze a communication performance of each network group, based on a reception result of the response signal.

In an embodiment, the controller may measure an average response time and a communication success rate of the plurality of meters, based on a reception result on the response signal, and may analyze a communication performance of each network group based on a measurement result.

In an embodiment, the controller may calculate a communication time allocated to each network group, based on a measurement result on the average response time, and may set a calculated result as the communication plan.

In an embodiment, the controller may subdivide the plurality of meters included in each network group, based on a measurement result on the communication success rate.

In an embodiment, the controller may calculate an allocated communication time and a communication attempt frequency by each detailed group, and may set a calculated result as the communication plan.

To achieve these and other advantages and in accordance with the purpose of this specification, as embodied and broadly described herein, there is also provided a communication method of a three-phase power line communication apparatus, the method including: transmitting a communication information request signal to a plurality of meters installed on each of three phases; receiving, from the plurality of meters, communication information, a response to the communication information request signal; establishing a network group for each of the three phases, based on the communication information; generating a communication plan for communication with each network group by analyzing a communication performance of each network group; and performing communication with the plurality of meters according to the communication plan.

In an embodiment, the plurality of meters may perform communication with a neighboring meter, and generate the communication information by measuring a communication state with the neighboring meter.

In an embodiment, the step of generating a communication plan for communication with each network group by analyzing a communication performance of each network group may include: a step of transmitting a test signal to the plurality of meters included in each network group at least once; a step of receiving a response signal to the test signal from the plurality of meters; and a step of generating a communication plan for communication with each network group by analyzing a communication performance of each network group based on a reception result on the response signal.

In an embodiment, in step of generating a communication plan for communication with each network group by analyzing a communication performance of each network group based on a reception result on the response signal, an average response time and a communication success rate of the plurality of meters are measured based on the reception result on the response signal, and a communication performance of each network group may be analyzed based on a measurement result.

In an embodiment, in step of generating a communication plan for communication with each network group by analyzing a communication performance of each network group based on a reception result on the response signal, a communication time allocated to each network group may be calculated based on a measurement result on the average response time, and a calculated result may be set as the communication plan.

In an embodiment, in step of generating a communication plan for communication with each network group by analyzing a communication performance of each network group based on a reception result on the response signal, the plurality of meters included in each network group may be subdivided into detailed groups, based on a measurement result on the communication success rate.

In an embodiment, in step of generating a communication plan for communication with each network group by analyzing a communication performance of each network group based on a reception result on the response signal, an allocated communication time and a communication attempt frequency may be calculated by each detailed group, and a calculated result may be set as the communication plan.

The three-phase power line communication apparatus and the communication method thereof according to the present invention may have the following advantages.

Firstly, since a network group is established for each of three phases and communication is performed by each network group, communication collision due to simultaneous communication among the plurality of phases can be prevented.

Secondly, since a network group is established for each of three phases and communication is performed by each network group, communication can be performed precisely and systematically.

Thirdly, since a network group is established for each of three phases and communication is performed by each network group, data exchange and data management between communication apparatuses can be facilitated.

Fourthly, since each network group is established based on communication information received from a plurality of meters, establishment of each network group can be executed more widely and accurately.

Fifthly, since communication is performed by generating a communication plan by each network group, unnecessary transmission/reception of a communication signal between communication apparatuses can be reduced.

Sixthly, since communication is performed by generating a communication plan by each network group, communication can be performed between communication apparatuses flexibly, efficiently and effectively.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
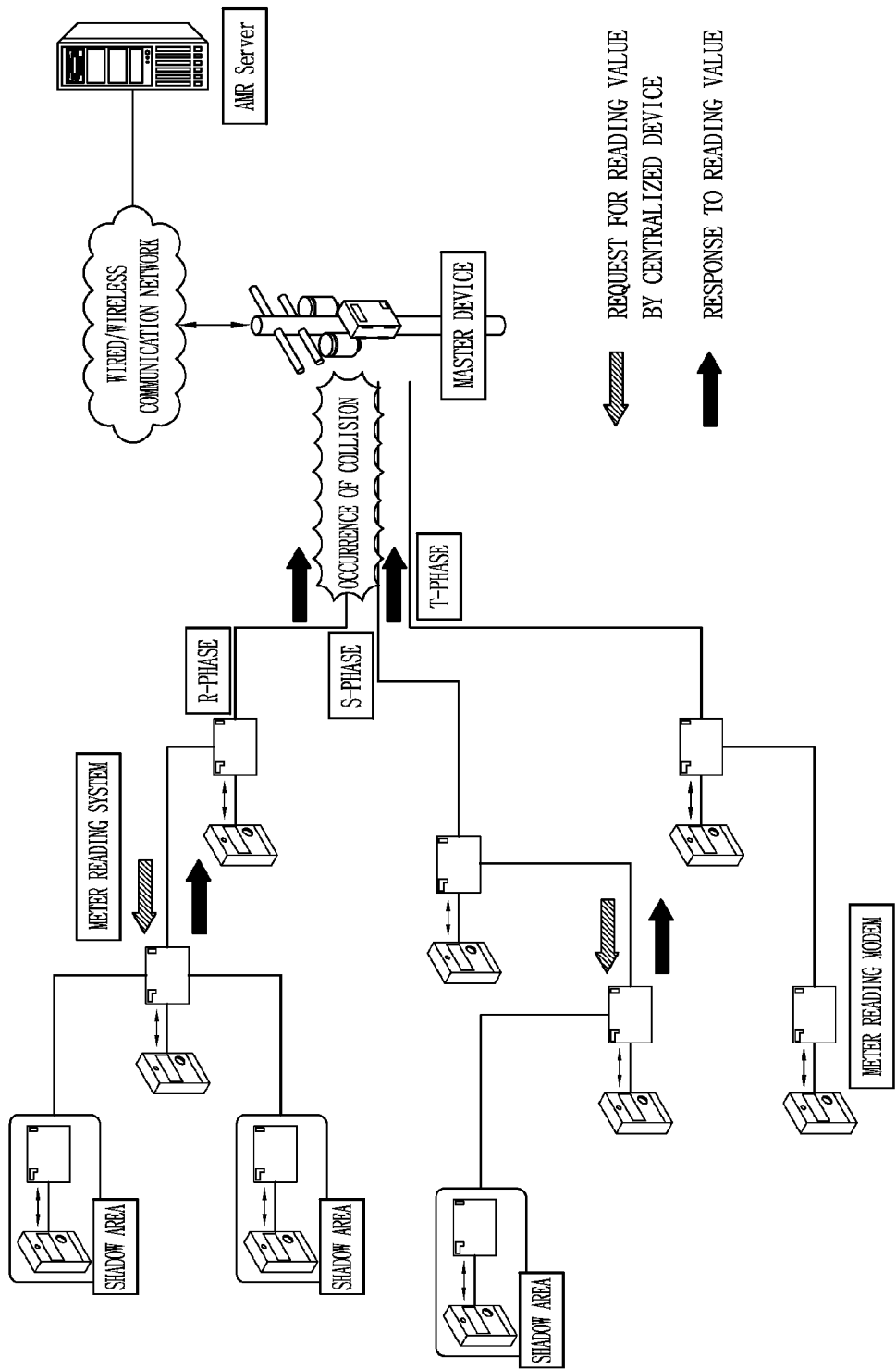
FIG. 1 is a conceptual view illustrating a configuration and an operation of a remote reading system in accordance with the conventional art.

Description will now be given in detail of preferred configurations of a three-phase power line communication apparatus and a communication method thereof according to the present invention, with reference to the accompanying drawings.

The present invention may be applicable to a three-phase power line communication apparatus and a communication method thereof. However, the present invention is not limited to this. That is, the present invention may be applicable to all of the existing power line communication apparatuses, systems and methods to which the technical scope of the present invention may be applicable. Especially, the present invention may be usefully applied to remote reading through power line communication.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Description will now be given in detail of the exemplary embodiments, with reference to the accompanying drawings. For the sake of brief description with reference to the drawings, the same or equivalent components will be provided with the same reference numbers, and description thereof will not be repeated.

If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents. Hereinafter, a three-phase power line communication apparatus and a communication method thereof according to the present invention will be explained in more detail with reference to FIGS. 2 to 7.

Figure 2:
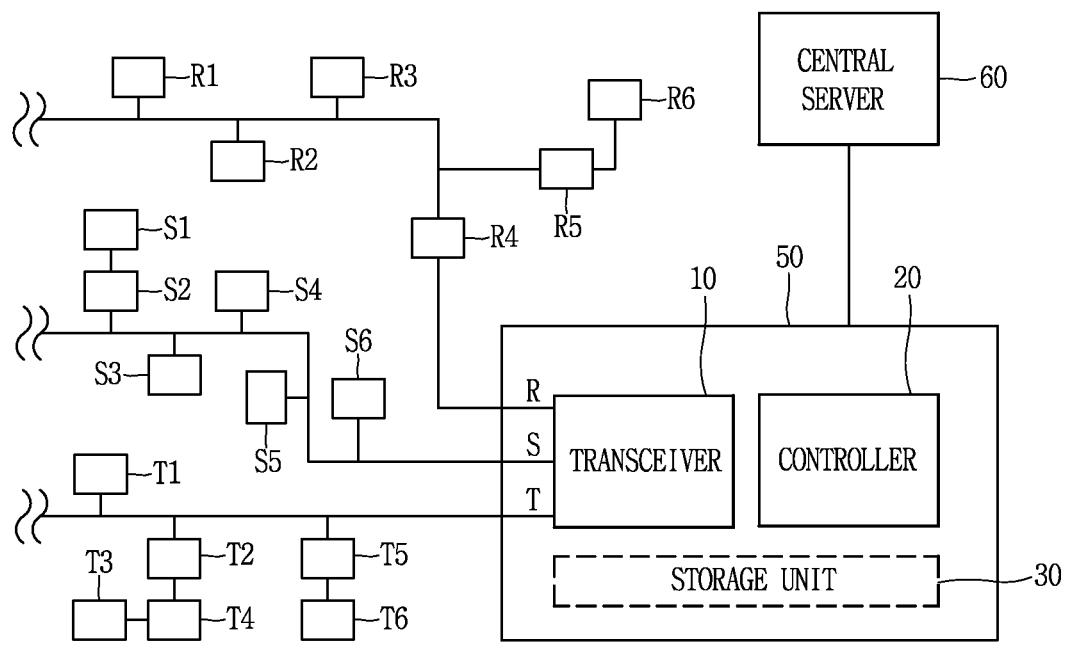
FIG. 2 is an exemplary view illustrating a configuration and an embodiment of a three-phase power line communication apparatus according to the present invention.
Figure 3:
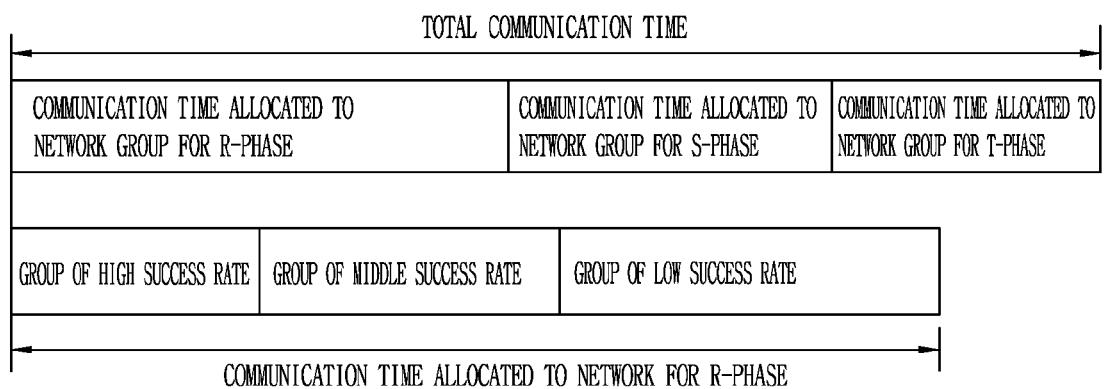
FIG. 3 is a first exemplary view illustrating a three-phase power line communication apparatus and a communication method thereof according to the present invention.
Figure 4:
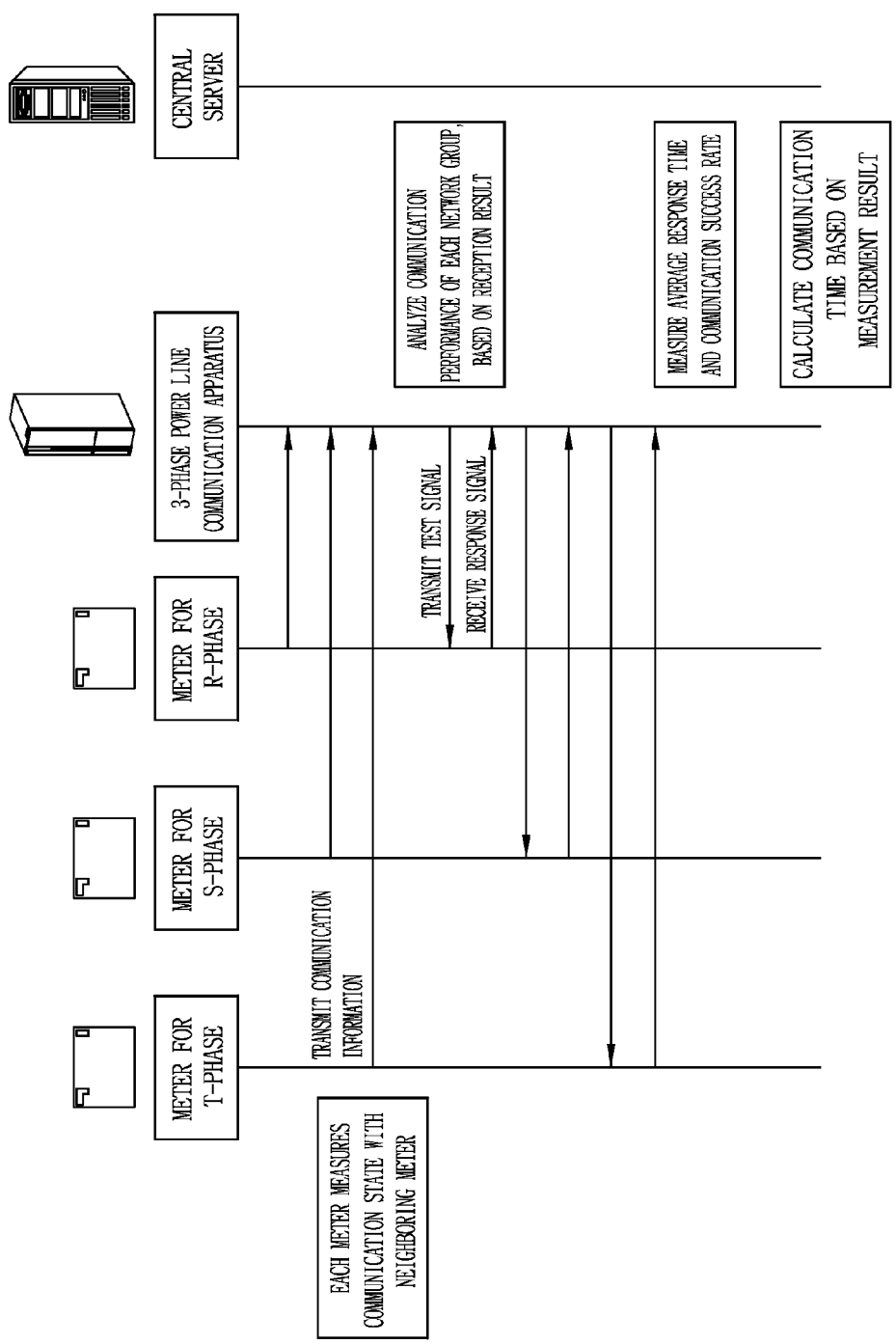
FIG. 4 is a second exemplary view illustrating a three-phase power line communication apparatus and a communication method thereof according to the present invention.
Figure 5:
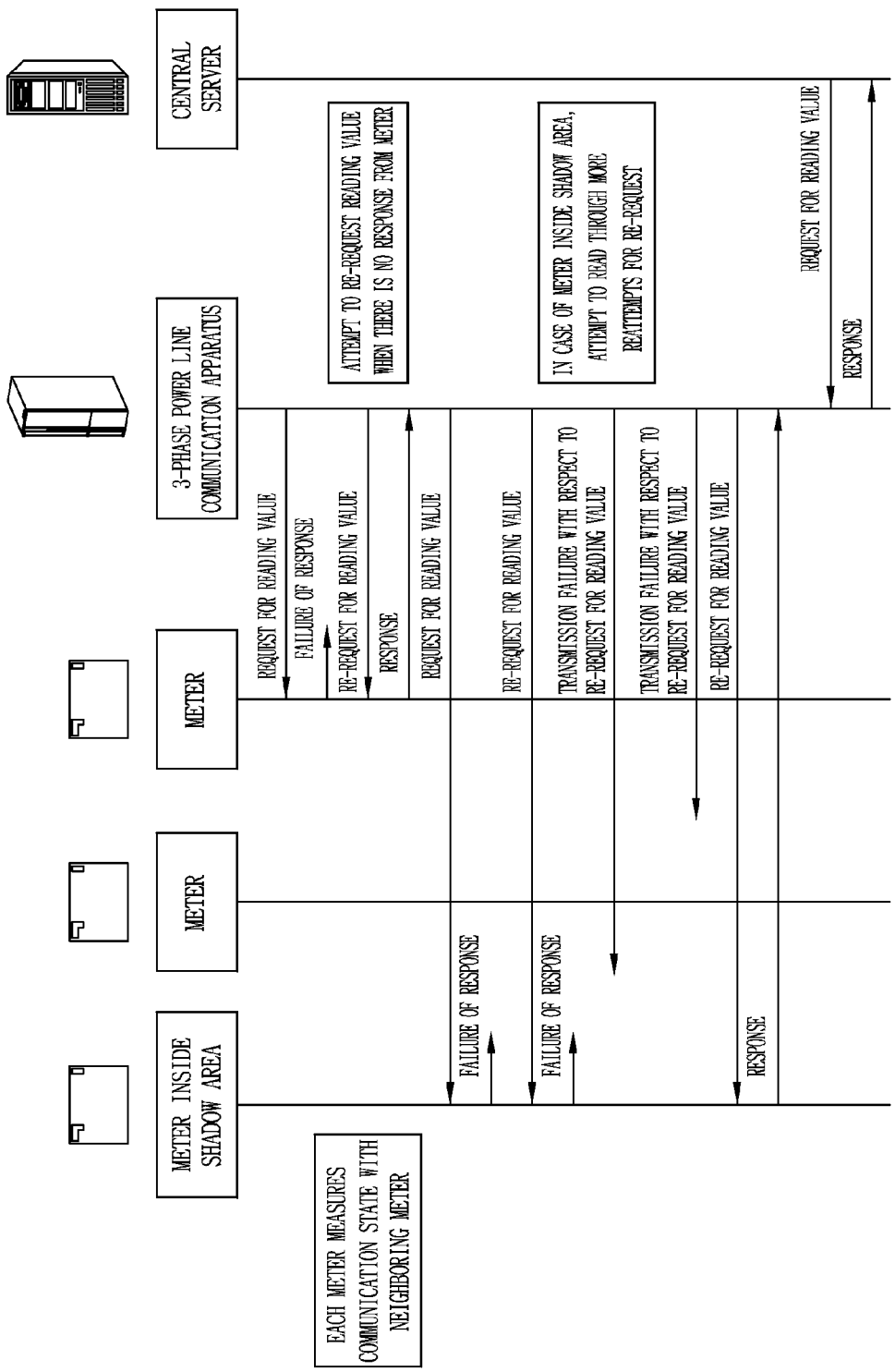
FIG. 5 is a third exemplary view illustrating a three-phase power line communication apparatus and a communication method thereof according to the present invention.
Figure 6:
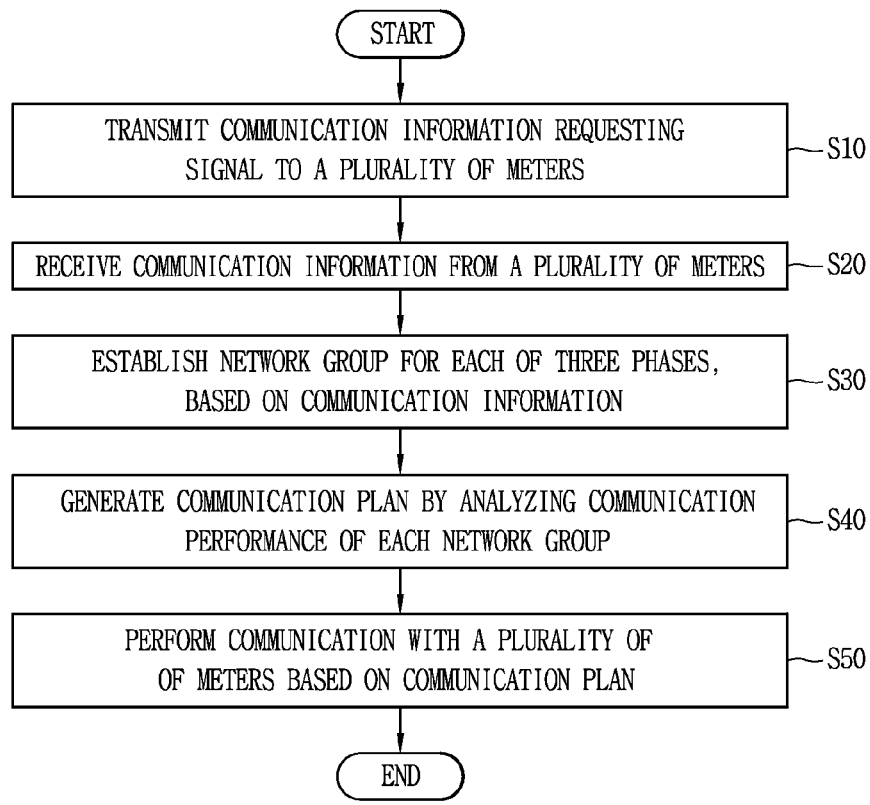
FIG. 6 is a flowchart illustrating a communication method of a three-phase power line communication apparatus according to the present invention.
Figure 7:
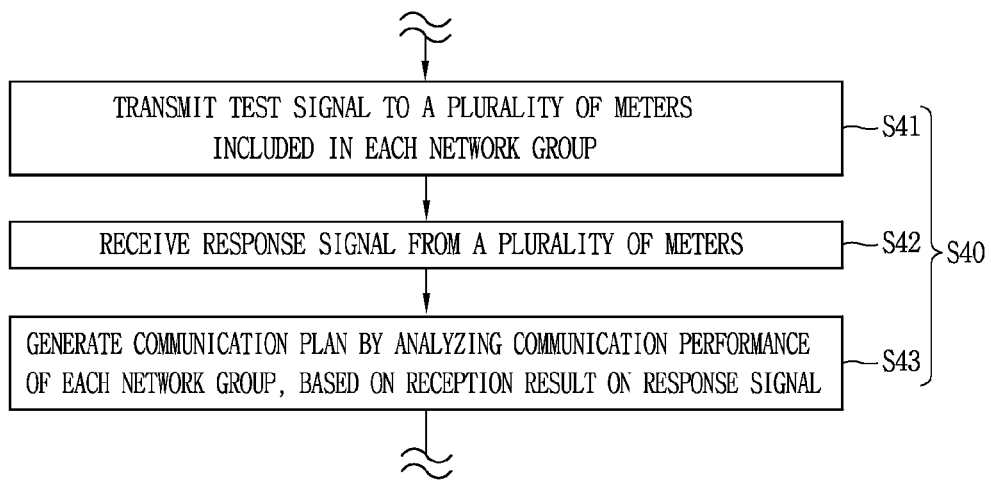
FIG. 7 is a flowchart illustrating an additional communication method of a three-phase power line communication apparatus according to the present invention.

FIG. 2 is an exemplary view illustrating a configuration and an embodiment of a three-phase power line communication apparatus according to the present invention. FIG. 3 is a first exemplary view illustrating a three-phase power line communication apparatus and a communication method thereof according to the present invention. FIG. 4 is a second exemplary view illustrating a three-phase power line communication apparatus and a communication method thereof according to the present invention. FIG. 5 is a third exemplary view illustrating a three-phase power line communication apparatus and a communication method thereof according to the present invention. FIG. 6 is a flowchart illustrating a communication method of a three-phase power line communication apparatus according to the present invention. FIG. 7 is a flowchart illustrating an additional communication method of a three-phase power line communication apparatus according to the present invention.

As shown in FIG. 2, the three-phase power line communication apparatus 50 (hereinafter, will be called 'communication apparatus') includes a transceiver 10 configured to transceive (transmit and receive) communication information and reading data with a plurality of meters (R1~R6, S1~S6, T1~T6) installed on three phases, through communication with the plurality of meters; and a controller 20 configured to establish a network group for each of the three phases based on the communication information received from the plurality of meters (R1~R6, S1~S6, T1~T6), to generate a communication plan for communication with each of the network groups by analyzing a communication performance of each of the network groups, and to control communication with the plurality of meters based on the communication plan.

The three phases may be configured as R, S and T phases, and power transmission and power distribution may be performed by each of the three phases.

Each of the three phases is connected to a consumer which consumes power or a load, thereby supplying power to the consumer or load.

A plurality of meters (R1~R6, S1~S6 or T1~T6) may be installed on each of the three phases.

For instance, as shown in FIG. 2, meters R1~R6 may be installed for R-phase, meters S1~S6 may be installed for S-phase, and meters T1~T6 may be installed for R-phase.

A power consumption amount consumed by the consumer or load connected to each of the three phases may be read, through the plurality of meters installed for each of the three phases (R1~R6, S1~S6 or T1~T6).

The plurality of meters (R1~R6, S1~S6 or T1~T6) may be reading meters for reading a power consumption amount consumed by the consumer or load.

The plurality of meters (R1~R6, S1~S6 or T1~T6) may be digital meters which can perform communication therebetween.

The plurality of meters (R1~R6, S1~S6 or T1~T6) may be digital meters which can perform communication with the communication apparatus 50.

The plurality of meters (R1~R6, S1~S6 or T1~T6) may include a modem configured to perform communication with a neighboring meter among the plurality of meters and the communication apparatus 50.

The plurality of meters (R1~R6, S1~S6 or T1~T6) may read a power consumption amount consumed by the consumer or load, and may transmit a reading result to the communication apparatus 50.

The plurality of meters (R1~R6, S1~S6 or T1~T6) may read a power consumption amount consumed by the consumer or load connected to a phase where they are installed, respectively.

The plurality of meters (R1~R6, S1~S6 or T1~T6) may perform communication with a neighboring meter, and generate the communication information by measuring a communication state with the neighboring meter.

Each of the plurality of meters (R1~R6, S1~S6 or T1~T6) may generate the communication information on the communication state with the neighboring meter, and may transmit the communication information to the communication apparatus 50.

The communication apparatus 50 may be a communication apparatus which can perform communication with the plurality of meters (R1~R6, S1~S6 or T1~T6).

The communication apparatus 50 may be connected to each of the three phases.

The communication apparatus 50 may be connected to each of the three phases, thereby performing communication with the plurality of meters (R1~R6, S1~S6 or T1~T6) installed for each phase, by a PLC method.

The PLC method means a power line communication method.

The communication apparatus 50 may perform communication with the plurality of meters (R1~R6, S1~S6 or T1~T6) installed for each of the three phases, through the transceiver 10.

The communication apparatus 50 may perform communication with the plurality of meters (R1~R6, S1~S6 or T1~T6) through the transceiver 10, thereby receiving the reading result from the plurality of meters (R1~R6, S1~S6 or T1~T6).

The communication apparatus 50 may further include a storage unit 30 configured to store therein the reading result received from the plurality of meters (R1~R6, S1~S6 or T1~T6).

The communication apparatus 50 may perform communication with a central server 60 which monitors and controls a power reception/supply state of the three phases.

The central server 60 may check a power reception/supply state of the three phases, through communication with the communication apparatus 50.

The central server 60 may receive, from the communication apparatus 50, the reading result transmitted from the plurality of meters (R1~R6, S1~S6 or T1~T6), thereby checking a power reception/supply state of the three phases based on the reading result.

The central server 60 may request the reading result from the communication apparatus 50, so as to check the power reception/supply state of the three phases.

The central server 60 may transmit a reading command of the plurality of meters (R1~R6, S1~S6 or T1~T6) to the communication apparatus 50, so as to check the power reception/supply state of the three phases, so that the plurality of meters (R1~R6, S1~S6 or T1~T6) can perform reading through the communication apparatus 50.

The communication apparatus 50 may transmit, to the central server 60, the reading result received from the plurality of meters (R1~R6, S1~S6 or T1~T6).

The transceiver 10 may receive, from the plurality of meters (R1~R6, S1~S6 or T1~T6) installed on each of the three phases, the communication information on a communication state of the plurality of meters (R1~R6, S1~S6 or T1~T6) and the reading data on the reading result by the plurality of meters (R1~R6, S1~S6 or T1~T6).

The transceiver 10 may be implemented as at least one communication interface connected to each of the three phases.

That is, the communication apparatus 50 is connected to each of the three phases, through the transceiver 10 implemented as at least one communication interface connected to each of the three phases, thereby communicating with the plurality of meters (R1~R6, S1~S6 or T1~T6) installed on each of the three phases.

The transceiver 10 may perform communication with each of the plurality of meters (R1~R6, S1~S6 or T1~T6).

For instance, when communication with one of the plurality of meters (R1~R6) installed on R phase of the three phases is required, i.e., when communication information on a specific meter is required, the transceiver 10 may selectively perform communication with the one of the plurality of meters (R1~R6).

Once the transceiver 10 receives the communication information from the plurality of meters (R1~R6, S1~S6 or T1~T6), the controller 20 may establish a network group for communication with the plurality of meters (R1~R6, S1~S6 or T1~T6), and may generate the communication plan, based on the communication information.

The controller 20 establishes a network group by each of the three phases, based on the communication information received from the plurality of meters (R1~R6, S1~S6 or T1~T6).

The network group means a group of the plurality of meters (R1~R6, S1~S6 or T1~T6) with which the communication apparatus 50 is to perform communication, according to a communication state and a communication condition.

The network group may be implemented for each of the three phases, based on the communication information received from the plurality of meters (R1~R6, S1~S6 or T1~T6).

That is, the network group may be composed of a group for R phase of the three phases, a group for S phase of the three phases, and a group for T phase of the three phases.

The controller 20 may control communication between the communication apparatus 50 and the plurality of meters (R1~R6, S1~S6 or T1~T6) installed for each of the three phases, by each of the network groups.

The controller 20 transmits a test signal to the plurality of meters (R1~R6, S1~S6 or T1~T6) included in each of the network groups, at least once. Then, the controller 20 may receive a response signal to the test signal, from the plurality of meters (R1~R6, S1~S6 or T1~T6), and may analyze a communication performance of each of the network groups, based on a reception result of the response signal.

That is, the controller 20 may establish a network group for each of the three phases, based on the communication information received from the plurality of meters (R1~R6, S1~S6 or T1~T6). Then, the controller 20 may transceive the test signal and the response signal with the plurality of meters (R1~R6, S1~S6 or T1~T6) included in each network group, for analysis of a communication performance of each network group.

The controller 20 transmits the test signal to each network group. In this instance, the controller 20 may transmit the test signal to each of the plurality of meters (R1~R6, S1~S6 and T1~T6) included in each network group.

That is, the controller 20 may transmit the test signal to each of the plurality of meters (R1~R6, S1~S6 and T1~T6), and may receive the response signal from each of the plurality of meters (R1~R6, S1~S6 and T1~T6).

The controller 20 may transmit the test signal to each of the plurality of meters (R1~R6, S1~S6 or T1~T6), at least once.

The controller 20 may analyze a communication performance of each network group, based on a reception result on the response signal.

For instance, the controller 20 may analyze a communication performance of each network group, based on strength, a transmission time, a type, etc. of the response signal.

The controller 20 may analyze a communication performance of a corresponding network group, based on a reception result on the response signal, the reception result received from each of the plurality of meters (R1~R6, S1~S6 or T1~T6) included in each network group.

For instance, when analyzing a communication performance of a network group for R phase of the three phases, the controller 20 may collect a reception result on the response signal, the reception result received from the plurality of meters (R1~R6) included in the network group for R phase. Then, the controller 20 may calculate an average value or a total sum of the reception result on the response signal.

The controller 20 may measure an average response time and a communication success rate of the plurality of meters (R1~R6, S1~S6 or T1~T6), based on a reception result on the response signal, the reception result received from the plurality of meters (R1~R6, S1~S6 or T1~T6).

The average response time may be an average value of time from a time point when the response signal has been transmitted from the plurality of meters (R1~R6, S1~S6 or T1~T6), to a time point when the response signal has been received by the communication apparatus 50.

The average response time may be an average value of time from a time point when the communication apparatus 50 has transmitted the test signal to the plurality of meters (R1~R6, S1~S6 or T1~T6), to a time point when the communication apparatus 50 has received the response signal.

The communication success rate may be a value with respect to communication success between the communication apparatus 50 and the plurality of meters (R1~R6, S1~S6 or T1~T6).

When reception of the test signal or transmission of the response signal is impossible since the plurality of meters (R1~R6, S1~S6 or T1~T6) is installed at a shadow area, communication between the plurality of meters (R1~R6, S1~S6 or T1~T6) and the communication apparatus 50 may fail. For prevention of this, the controller 20, the controller 20 measures the communication success rate between the communication apparatus 50 and the plurality of meters (R1~R6, S1~S6 or T1~T6), thereby analyzing a communication performance of each network group.

The controller 20 analyzes a communication performance of each network group, thereby generating a communication plan for communication between the communication apparatus 50 and each network group. In this instance, the controller 20 may calculate a communication time allocated to each network group, based on a measurement result on the average response time, and may set a calculated result as the communication plan.

That is, the controller 20 generates the communication plan for communication between the communication apparatus 50 and each network group, based on an analysis result on a communication performance of each network group. In this instance, the controller 20 may calculate a communication time allocated to each network group, based on a measurement result on the average response time, and may set a calculated result as the communication plan, such that the communication performance analyzed based on the average response time of the plurality of meters (R1~R6, S1~S6 or T1~T6) is reflected to the communication plan.

For instance, a network group, where the number of meters having a short average response time is large, has a short communication time. On the other hand, a network group, where the number of meters having a long average response time is large, has a long communication time. The respective times may be set as the communication plan.

The controller 20 may control communication between the communication apparatus 50 and each network group, based on the communication plan where communication time is set by each network group.

For instance, it is assumed that an entire communication time between the communication apparatus 50 and each network group is 100 [s], a communication time allocated to a network group for R phase is 30 [s], a communication time allocated to a network group for S phase is 50 [s], and a communication time allocated to a network group for T phase is 20 [s]. In this instance, the controller 20 may control the communication apparatus 50 to communicate with the network group for R phase for 30 [s], to communicate with the network group for S phase for 50 [s], and to communicate with the network group for T phase for 20 [s].

The controller 20 may calculate a communication time allocated to each network group, based on a measurement result on the average response time, and may set the calculated communication time as the communication plan. Then, the controller 20 may subdivide the plurality of meters (R1~R6, S1~S6 or T1~T6) included in each network group, based on a measurement result on the communication success rate.

That is, the controller 20 may subdivide the plurality of meters (R1~R6, S1~S6 or T1~T6) included in each network group, based on a measurement result on the communication success rate, for a detailed communication plan for communication between the communication apparatus 50 and each of the plurality of meters (R1~R6, S1~S6 or T1~T6) included in each network group.

The controller 20 may divide the plurality of meters (R1~R6, S1~S6 or T1~T6) included in each network group, into at least two groups, based on the communication success rate between the communication apparatus 50 and each of the plurality of meters (R1~R6, S1~S6 or T1~T6) included in each network group.

For instance, the controller 20 may subdivide the plurality of meters (R1~R6, S1~S6 or T1~T6) included in each network group, into meters installed at a communication-enabled region, meters installed at a communication shadow region, meters installed at a short-time communication-enabled region, meters installed at a long-time communication-enabled region, etc.

The controller 20 may calculate an allocated communication time and a communication attempt frequency by each detailed group, and may set a calculated result as the communication plan.

As the controller 20 calculates an allocated communication time and a communication attempt frequency by each detailed group, and sets a calculated result as the communication plan, the communication plan may be set to each of the plurality of meters (R1~R6, S1~S6 or T1~T6).

One example of the aforementioned communication plan will be explained with reference to FIGS. 3 to 5.

The communication plan may be set as an example shown in FIG. 3. A communication time allocated to each network group, and a detailed communication time allocated to each of the plurality of meters included in each network group may be set.

That is, a communication time allocated to each network group (upper group) for each of the three phases, and a detailed communication time allocated to a detailed group (lower group) of the plurality of meters included in each network group may be set.

This concept is illustrated in FIG. 4. As shown in FIG. 4, a communication time allocated to each network group is set based on a measurement result on the average response time of the response signal to the test signal, and a communication time allocated to each detailed group of the plurality of meters is set based on a measurement result on the communication success rate.

Once the communication time allocated to each network group and each detailed group is set as the communication plane, only a corresponding group may communicate with the communication apparatus 50 for communication time allocated according to the communication plan.

For instance, when the communication apparatus 50 communicated with a network group for R phase, communication of a network group for S phase and a network group for T phase with the communication apparatus 50 may be delayed until a communication time allocated to the network group for R phase expires.

Communication order between the communication apparatus 50 and each network group may be set to the communication plan.

For instance, the controller 20 may set communication between the communication apparatus 50 and the network group for R phase with a first priority, communication between the communication apparatus 50 and the network group for T phase with a second priority, and communication between the communication apparatus 50 and the network group for S phase with a third priority, based on the measurement result or a control command of the central server 60. Then, the controller 20 may control the communication apparatus 50 to communicate with the network group for R phase, the network group for T phase, and the network group for S phase, sequentially, according to the set communication plan.

Once communication times allocated to each network group and each detailed group are set based on the communication plan, communication shown in FIG. 5 may be performed.

FIG. 5 illustrates the concept of communication for reading the power consumption amount consumed on the three phases. As shown in FIG. 5, when the communication apparatus 50 communicates with the plurality of meters included in the detailed groups according to the communication plane, meters, which are included in a group having a small communication obstacle by being installed at an area close to the communication apparatus 50, are allocated with a shorter communication time than meters included in a group having a large communication obstacle. On the other hand, meters, which are included in a group having a large communication obstacle by being installed at a shadow area far from the communication apparatus 50, are allocated with a relatively longer communication time. In this instance, when communication fails, the meters included in a group having a large communication obstacle may make more attempts to re-request a reading value than the meters included in a group having a small communication obstacle.

Hereinafter, a communication method of a three-phase power line communication apparatus according to the present invention will be explained with reference to FIGS. 6 and 7.

As shown in FIG. 6, a communication method of the three-phase power line communication apparatus (hereinafter, will be referred to as a communication method) includes transmitting a communication information request signal to a plurality of meters installed on each of three phases (S10); receiving, from the plurality of meters, communication information, a response to the communication information request signal (S20); establishing a network group for each of the three phases, based on the communication information (S30); generating a communication plan for communication with each network group by analyzing a communication performance of each network group (S40); and performing communication with the plurality of meters according to the communication plan (S50).

The plurality of meters may be installed on each of the three phases.

The plurality of meters installed on each of the three phases may read a power consumption amount consumed by a consumer or a load connected to the three phases.

The plurality of meters may be reading meters for reading a power consumption amount consumed by the consumer or load.

The plurality of meters may be digital meters which can perform communication therebetween.

The plurality of meters may be digital meters which can perform communication with the communication apparatus.

The plurality of meters may perform communication with a neighboring meter, and generate the communication information by measuring a communication state with the neighboring meter.

In step (S10) of transmitting a communication information request signal to a plurality of meters installed on each of three phases (S10), the communication apparatus may transmit the communication information request signal to the plurality of meters, so as to establish each network group.

In step (S20) of receiving communication information, a response to the communication information request signal from the plurality of meters, the plurality of meters receive the communication information request signal transmitted in S10, and transmit the communication information to the communication apparatus.

In step (S30) of establishing a network group for each of the three phases based on the communication information, the communication apparatus establishes a network group for each of the three phases, based on the communication information received in S20.

The network group means a group of the plurality of meters with which the communication apparatus is to perform communication, according to a communication state and a communication condition.

The network group may be implemented for each of the three phases, based on the communication information received from the plurality of meters.

In step (S40) of generating a communication plan for communication with each network group by analyzing a communication performance of each network group, the communication apparatus analyzes a communication performance of each network group established by itself in S30, thereby generating a communication plan for communication with each network group.

As shown in FIG. 7, the step (S40) of generating a communication plan for communication with each network group by analyzing a communication performance of each network group may include a step (S41) of transmitting a test signal to the plurality of meters included in each network group at least once, a step (S42) of receiving a response signal to the test signal from the plurality of meters, and a step (S43) of generating a communication plan for communication with each network group by analyzing a communication performance of each network group based on a reception result on the response signal.

In step (S41) of transmitting a test signal to the plurality of meters included in each network group at least once, the communication apparatus may transmit the test signal to each of the plurality of meters included in each network group at least once, so as to analyze a communication performance of each network group.

In step (S42) of receiving a response signal to the test signal from the plurality of meters, the communication apparatus may receive a response signal to the test signal transmitted to each of the plurality of meters in S41, from each of the plurality of meters.

In step (S43) of generating a communication plan for communication with each network group by analyzing a communication performance of each network group based on a reception result on the response signal, the communication apparatus may analyze a communication performance of each network group based on a reception result on the response signal received in S42, and may generate the communication plan for communication with each network group.

In step (S43) of generating a communication plan for communication with each network group by analyzing a communication performance of each network group based on a reception result on the response signal, an average response time and a communication success rate of the plurality of meters are measured based on a reception result on the response signal, and a communication performance of each network group may be analyzed based on a measurement result.

In step (S43) of generating a communication plan for communication with each network group by analyzing a communication performance of each network group based on a reception result on the response signal, a communication time allocated to each network group may be calculated based on a measurement result on the average response time, and a calculated result may be set as the communication plan.

For instance, a network group, where the number of meters having a short average response time is large, has a short communication time. On the other hand, a network group, where the number of meters having a long average response time is large, has a long communication time. The respective times may be set as the communication plan.

In step (S43) of generating a communication plan for communication with each network group by analyzing a communication performance of each network group based on a reception result on the response signal, the plurality of meters included in each network group may be subdivided into detailed groups, based on a measurement result on the communication success rate.

For instance, the plurality of meters included in each network group may be subdivided into meters installed at a communication-enabled region, meters installed at a communication shadow region, meters installed at a short-time communication-enabled region, meters installed at a long-time communication-enabled region, etc.

In step (S43) of generating a communication plan for communication with each network group by analyzing a communication performance of each network group based on a reception result on the response signal, an allocated communication time and a communication attempt frequency may be calculated by each detailed group, and a calculated result may be set as the communication plan.

The three-phase power line communication apparatus and the communication method thereof according to the present invention may be applied to a power line communication apparatus using a power line, a communication system and a communication method.

The three-phase power line communication apparatus and the communication method thereof according to the present invention may be applied to a remote reading apparatus using power line communication, a system and a method.

The three-phase power line communication apparatus and the communication method thereof according to the present invention may be applied to a communication apparatus of an outgoing panel and a distribution panel each composed of a three-phase power lines, a communication system, and a communication method.

The three-phase power line communication apparatus and the communication method thereof according to the present invention may be applied to a communication apparatus of a power plant and a substation each composed of a three-phase power lines, a communication system, and a communication method.

The three-phase power line communication apparatus and the communication method thereof according to the present invention may be applied to a three-phase three-wire distribution system and a three-phase four-wire distribution system.

The three-phase power line communication apparatus and the communication method thereof according to the present invention may be applied to a communication apparatus of a building where three-phase power is received, a factory, a large plant and passive equipment, a communication system, and a communication method.

The three-phase power line communication apparatus and the communication method thereof according to the present invention may have the following advantages.

Firstly, since a network group is established for each of three phases and communication is performed by each network group, communication collision due to simultaneous communication among the plurality of phases can be prevented.

Secondly, since a network group is established for each of three phases and communication is performed by each network group, communication can be performed precisely and systematically.

Thirdly, since a network group is established for each of three phases and communication is performed by each network group, data exchange and data management between communication apparatuses can be facilitated.

Fourthly, since each network group is established based on communication information received from a plurality of meters, establishment of each network group can be executed more widely and accurately.

Fifthly, since communication is performed by generating a communication plan by each network group, unnecessary transmission/reception of a communication signal between communication apparatuses can be reduced.

Sixthly, since communication is performed by generating a communication plan by each network group, communication can be performed between communication apparatuses flexibly, efficiently and effectively.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A three-phase power line communication apparatus, comprising:
    a transceiver configured to transceive communication information and reading data with a plurality of meters installed on three phases for three-phase power line communication, through communication with the plurality of meters; and a controller configured to:
   establish a network group for each of the three phases based on the communication information received from the plurality of meters;
   generate a communication plan for communication with each of the network groups by analyzing a communication performance of each of the network groups;
   control communication with the plurality of meters based on the communication plan;
   transmit a test signal to the plurality of meters included in each of the network groups, at least once;
   receive a response signal to the test signal from the plurality of meters; and
   analyze a communication performance of each network group based on a reception result of the response signal,
   wherein the analysis of the communication performance comprises measuring an average response time and a communication success rate of the plurality of meters based on a reception result on the response signal and analyzing a communication performance of each network group based on a result of the measurement.

2. The three-phase power line communication apparatus of claim 1, wherein the plurality of meters perform communication with a neighboring meter, and generate the communication information by measuring a communication state with the neighboring meter.

3. The three-phase power line communication apparatus of claim 1, wherein the transceiver is implemented as at least one communication interface connected to each of the three phases.

4. The three-phase power line communication apparatus of claim 1, wherein the controller is further configured to:
   calculate a communication time allocated to each network group, based on a measurement result on the average response time, and
   set a calculated result as the communication plan.

5. The three-phase power line communication apparatus of claim 4, wherein the controller is further configured to subdivide the plurality of meters included in each network group, based on a measurement result on the communication success rate.

6. The three-phase power line communication apparatus of claim 5, wherein the controller is further configured to:
   calculate an allocated communication time and a communication attempt frequency by each detailed group, and
   set a calculated result as the communication plan.

* * * * *